United States Patent [19]
Hook et al.

[11] 3,783,403
[45] Jan. 1, 1974

[54] DOUBLE PULSE LASER

[75] Inventors: William R. Hook, Los Angeles;
Ronald P. Hilberg, Redondo Beach;
Roland H. Dishington, Pacific
Palisades, all of Calif.

[73] Assignee: TRW Inc., Redondo Beach, Calif.

[22] Filed: Sept. 22, 1972

[21] Appl. No.: 291,203

[52] U.S. Cl. .............................................. 331/94.5
[51] Int. Cl. .............................................. H01s 3/10
[58] Field of Search .................................. 331/94.5

[56] References Cited
OTHER PUBLICATIONS
Fourney et al., Aerosol Size and Velocity Determination via Holography. Rev. Sci. Instr., Vol. 40, No. 2 (Feb. 1969) pp. 205–213

Primary Examiner—William L. Sikes
Attorney—Daniel T. Anderson et al.

[57] ABSTRACT

Double pulses are produced from a single laser by generating two successive optical pumping pulses from the same flash lamp and Q-switching once after each pumping pulse prior to the next pumping pulse.

5 Claims, 5 Drawing Figures

DOUBLE PULSE LASER

BACKGROUND OF THE INVENTION

1. Field of the Invention

This invention relates to Q-switched lasers and more particularly to an improved circuit arrangement for producing two or more rapidly recurring laser pulses from a single laser.

2. Description of the Prior Art

It is sometimes desired to produce two rapidly recurring laser pulses of substantially the same amplitude over a variable pulse interval. For example, in double pulse holography two laser pulses separated by an interval as short as 100 microseconds are used to produce interference fringes indicative of the change between an undistributed and a distributed object and thereby permit non-destructive testing of large structures.

In another example, certain distance measurement systems can obtain increased accuracy and reliability by transmitting a second redundant laser pulse within an interval as short as 100 microseconds of the first. In this type of system, it is desirable to be able to vary the interval between the pulses.

In yet another example, one type of range and range rate system requires the transmission of two closely spaced laser pulses.

Heretofore, some of the double pulse laser apparatus have employed more than one laser or else one laser with more than one flash lamp to provide successive pumping pulses. Efforts to simplify the apparatus by double Q-switching during a single optical pumping pulse have not produced entirely satisfactory results. Some of the problems associated with efforts in the latter direction are (a) the amplitudes of the laser pulses tend to vary with pulse separation; (b) the range of pulse separation adjustment is relatively small, and is typically only 25 to 60 microseconds; (c) in order to effectuate double Q-switching during a single optical pumping pulse, the Q-switching interval must be extremely short and is often less than the recovery time of some of the more common electro-optic modulators, such as $LiNbO_3$ or $KD*P$ crystals. These crystals typically exhibit acoustic ringing for as long as 50 microseconds.

SUMMARY OF THE INVENTION

In accordance with the invention, double pulses are produced from a single laser by generating two successive optical pumping pulses from the same flash lamp and Q-switching once after each pumping pulse prior to the next pumping pulse.

In a Q-switched laser apparatus there is provided a solid laser medium and a Q-switch positioned longitudinally adjacent to each other in a resonant cavity. A flash lamp is positioned laterally adjacent to the laser medium to irradiate it with pumping radiation. Means are provided for energizing the flash lamp repetitively for supplying optical pumping radiation to the solid laser medium in rapidly recurring bursts. Means are also provided for actuating the Q-switch at substantially the same rate that the flash lamp is energized but with a delay that is substantially equal to the duration of one of the optical pumping bursts. The interval between successive optical pumping bursts is substantially equal to the interval between successive Q-switch actuations and is no longer than the fluorescent lifetime of the solid laser medium.

DESCRIPTION OF THE PREFERRED EMBODIMENTS

Figure 1:
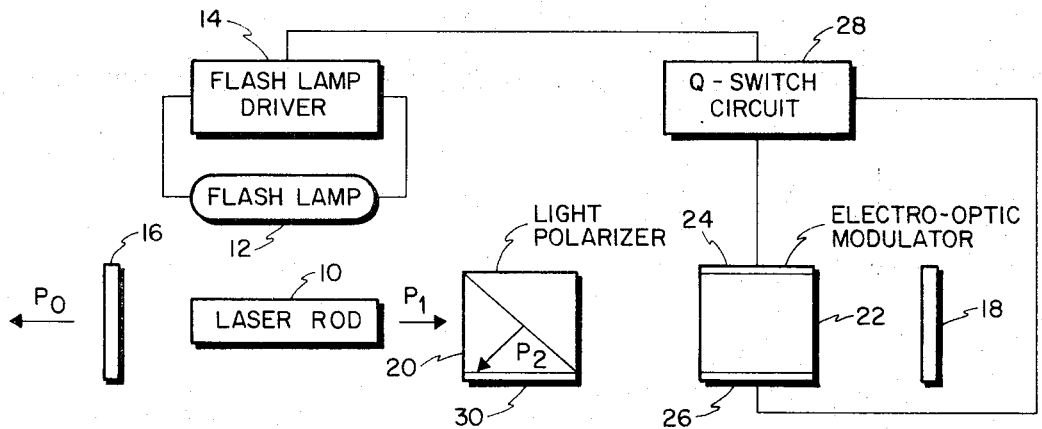
FIG. 1 is a block diagram of a Q-switched laser in which the invention finds use.

Referring now to FIG. 1, there is shown a schematic diagram of a Q-switched laser, including a laser rod 10, of ruby, neodymium in glass, calcium tungstate, or neodymium in yttrium aluminum garnet (Nd:YAG), for example. Next to the laser rod 10 there is mounted a pumping means, such as a xenon flash lamp 12, which is electrically excited by voltage from a flash lamp driver 14.

The laser rod 10 is mounted in an optical cavity between two mirrors, namely, a front mirror 16 and a rear mirror 18. The front mirror 16 may have 40 to 50 percent optical reflectivity to transmit the output laser beam, and the rear mirror 18 may be substantially totally reflecting.

A light polarizer 20 is mounted between one end of the laser rod 10 and the rear mirror 18, and an electrooptic modulator 22 is positioned between the light polarizer 20 and the rear mirror 18. The electro-optic modulator 22 is preferably a Pockels cell made from lithium niobate and provided with a pair of electrodes 24 and 26 on opposing surfaces thereof. So mounted together, the light polarizer 20 and the electro-optic modulator 22 comprise a Q-switch.

The electro-optic modulator 22 is energized by applying voltage to the two electrodes 24 and 26 from a Q-switch circuit 28. As shown, the Q-switch circuit 28 may receive an appropriately delayed signal from the flash lamp driver 14 to alter the output from the Q-switch circuit 28 and hence the voltage applied to the electro-optic modulator 22.

As described thus far, the Q-switched laser is substantially the same in structure and operation as the one disclosed in U. S. Pat. No. 3,497,828 issued Feb. 24, 1970 to C. L. Telk et al. In operation, the flash lamp 12 receives a pulse of current from the flash lamp driver 14 and emits a pulse of pumping radiation of the appropriate wavelength to excite molecules in the laser rod 10. Light is emitted from the laser rod 10 with different planes of polarization, but the light polarizer 20 is adapted to transmit light of one plane of polarization only. For example, if the light polarizer 20 is adapted to pass vertically polarized light only, then only the light that is emitted from the laser rod 10 with a polarization lying in a vertical plane will pass through the light polarizer 20 and impinge on the electrooptic modulator 22. The fast and slow axes of the electrooptic modulator 22 are oriented at 45° relative to the direction of polarization of the laser light impinging thereon.

At the same instant of time when the flash lamp driver 14 is actuated, or prior thereto, the electrodes 24 and 26 of the electro-optic modulator 22 receive a direct current voltage from the Q-switch circuit 28, thereby impressing an electric field on the modulator 22. The vertically polarized light exiting from the light polarizer 20 and entering the electro-optic modulator 22 is subjected to the electric field during its traversal of the electro-optic modulator 22. The effect of the electric field on the polarized light is such that one of the orthogonal light radiation components aligned with the axes of the electro-optic modulator 22 experiences a phase shift retardation of 90° or one-fourth wavelength relative to the other component.

Upon reflection of the light from the rear mirror 18 and its traversal of the electro-optic modulator 22 in the opposite direction, the same component of light is retarded an additional 90° or one-fourth wavelength, giving a combined phase shift of 180° or one-half wavelength between the two orthogonal light radiation components. The vector sum of these two light radiation components now results in a radiation polarization that is rotated 90° from the original polarization vector. That is, the light energy that was vertically polarized before it entered the electro-optic modulator 22 is now horizontally polarized after it passes twice through the modulator 22, first in one direction and then in the opposite direction.

When the rotated or horizontally polarized light energy enters the light polarizer 20, it does not pass through the latter but rather, it is deflected off the laser beam axis into a lossy element 30 mounted on a side of the light polarizer 20, where the light is absorbed. Under this condition, the optical cavity of the laser is said to be in a low Q or a high loss condition. The radiant power entering the Q-switch is represented in FIG. 1 by the arrow $P_1$, and the radiant power deflected out of the cavity or lost is represented by the arrow $P_2$. The ratio of $P_2/P_1$ is defined as the Q-switched cavity loss.

Recapitulating, when the flash lamp 12 is excited by the flash lamp driver 14, it initiates the pumping action on the laser rod 10 to cause a build-up of exicted atoms therein, and during that time voltage is impressed on the electro-optic modulator 22 to establish a low Q condition in the laser activity. All of the laser radiation is thereby confined within the laser cavity and, since no lasing build-up can occur because of the low Q condition, no laser output beam can issue from the front mirror 16.

After a predetermined period of time has elapsed to permit the excited atoms in the laser rod to reach a state of high population inversion, the Q-switch circuit 28 operates to alter the voltage on the electro-optic modulator 22, that is, to switch it to zero and thereby establish in the cavity a low loss or high Q condition. As will be described later on, the Q-switch circuit 28 generates a voltage waveform which, when impressed on the electro-optic modulator 22, alters the transmission characteristics of the Q-switch in such a way that it reaches its maximum transparency at the very moment the laser output pulse appears. In FIG. 1, the output radiant power is represented by the arrow $P_0$. The interval between the time when the voltage on the electro-optic modulator is switched and the time when the laser output pulse appears is known as the laser build-up time and is a characteristic that is fixed by the particular design of the laser. For a solid state laser, the laser build-up time is typically in the range of 50 to 200 nanoseconds.

In accordance with the invention, the flash lamp driver 14 and Q-switch circuit 28 are designed to operate in conjunction with each other to generate two or more rapidly recurring laser pulses with variable pulse intervals ranging from about 80 microseconds to 2,000 microseconds.

Figure 2:
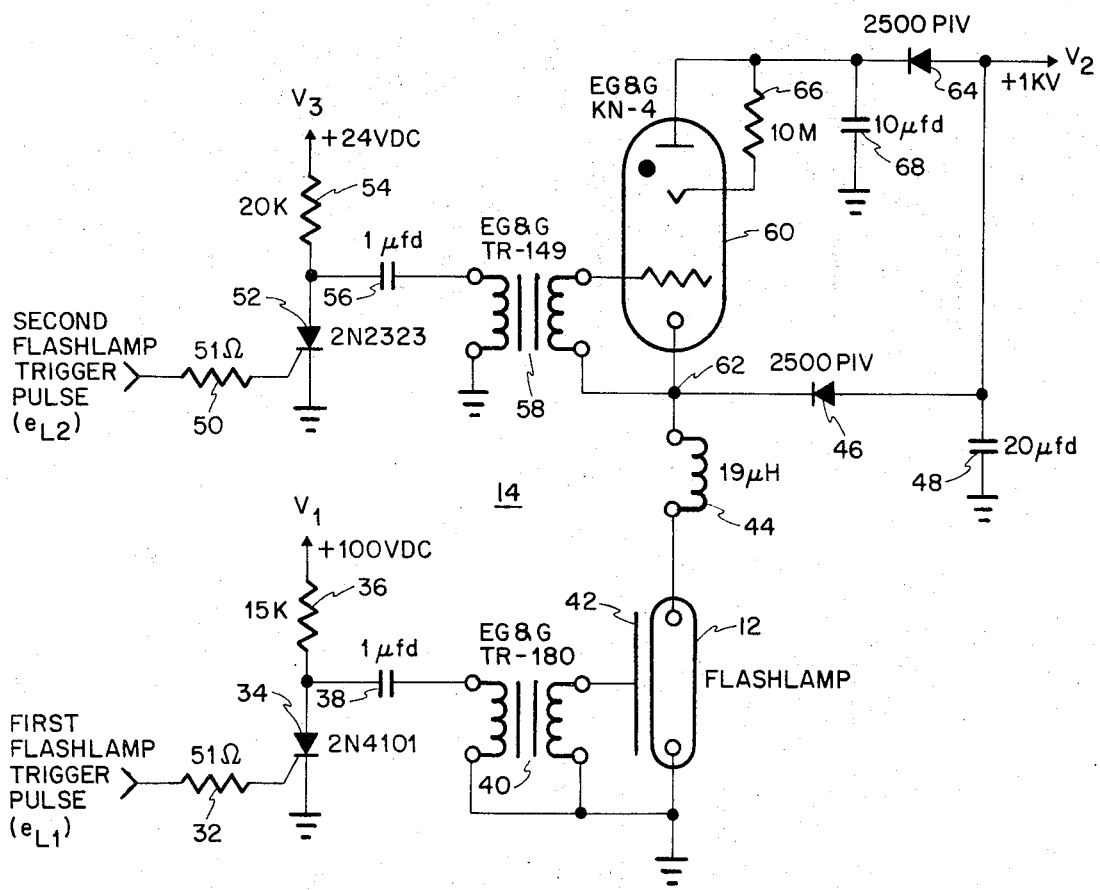
FIG. 2 is a circuit diagram of the flash lamp drive circuit portion of the double Q-switched laser.

Referring now to FIG. 2, there is shown a detailed schematic diagram of the flash lamp driver 14. A flash lamp trigger pulse $e_{L1}$ is applied through a series resistor 32 to the gate electrode of a silicon controlled rectifier 34. The cathode of the rectifier 34 is grounded and the anode is connected through a dropping resistor 36 to a positive dc voltage supply $V_1$. The anode of the rectifier 34 is connected through a blocking capacitor 38 to one side of the primary winding of a pulse transformer 40. The other side of the primary winding and one side of the secondary winding are connected to ground.

The high voltage side of the secondary winding of the transformer 40 is connected to an external starting element 42 for the flash lamp 12. The starting element 42 may comprise the usual laser head in which both the laser rod 10 and the flash lamp 12 are housed adjacent to each other.

The main electrodes of the flash lamp 12 are connected in a discharge circuit including a current limiting choke 44, a diode 46 having its cathode connected to the choke 44, and an energy storage capacitor 48 connected between the anode of the diode 46 and ground. The capacitor 48 is initially charged to a high positive dc voltage by connection to a high voltage supply $V_2$. A discussion of the process of flash lamp triggering is contained in a paper by the inventors herein, entitled "Xenon Flashlamp Triggering for Laser Applications," published in the IEEE Transactions on Electron Devices, Vol. EO–19, No. 3, March 1972, page 308.

A second flash lamp trigger pulse $e_{L2}$ is applied through a series resistor 50 to the gate electrode of a silicon controlled rectifier 52. The cathode of the rectifier is grounded and the anode is connected through a dropping resistor 54 to a positive dc voltage supply $V_3$.

The anode of the rectifier 52 is connected through a blocking capacitor 56 to one side of the primary winding of a pulse transformer 58. The other side of the primary winding is grounded.

The high voltage side of the pulse transformer 58 is connected to the control grid of a high voltage, cold cathode gas switch tube 60, such as a Krytron type tube manufactured by EG and G, Inc. The low voltage side of the transformer 58 and the cathode of the switch tube 60 are connected to a junction point 62 where the choke 44 and the cathode of the diode 46 are also connected. The anode of the switch tube 60 is connected through a diode 64 to the high voltage supply $V_2$. A dropping resistor 66 of high resistance value connected between the anode and the keep alive grid reduces the dc voltage on the latter to a low value sufficient to maintain a low level of ionization between the starting element and the cathode in the quiescent state. An energy storage capacitor 68 is connected between the anode of the switch tube 60 and ground.

In operating the flash lamp driver circuit 14 of FIG. 2, the first flash lamp trigger pulse $e_{L1}$ is initially applied to the gate electrode of the silicon controlled rectifier 34, causing the latter to conduct. The capacitor 38, having been charged to the potential of the supply voltage $V_1$ thereupon discharges through the conducting rectifier 34 and the primary winding of the pulse transformer 40. The resulting current pulse flowing in the primary winding induces a negative voltage pulse in the secondary winding of the pulse transformer 40 which drives the starting element 42 negatively and thereby initiates partial ionization of the flash lamp 12.

When the flash lamp 12 becomes ionized, it provides a conducting path for the energy storage capacitor 48 previously charged to the potential of the supply voltage $V_2$, to discharge. The resulting large current pulse, the magnitude of which is limited by the choke 44, causes the flash lamp to emit the first burst of desired pumping radiation for the laser rod.

At or near the termination of the flash lamp current pulse, the Q-switch circuit 28 of FIG. 1, which will be described in more detail later, is energized to cause the first laser pulse to be emitted. As will be seen in the waveform chart of FIG. 3, waveform (a) shows the first flash lamp trigger pulse $e_{L1}$, waveform (b) shows the first flash lamp current pulse $I_{L1}$, waveform (c) shows the first Q-switch input pulse $e_{Q1}$, and waveform (d) shows the first laser output pulse $P_1$.

Figure 3:
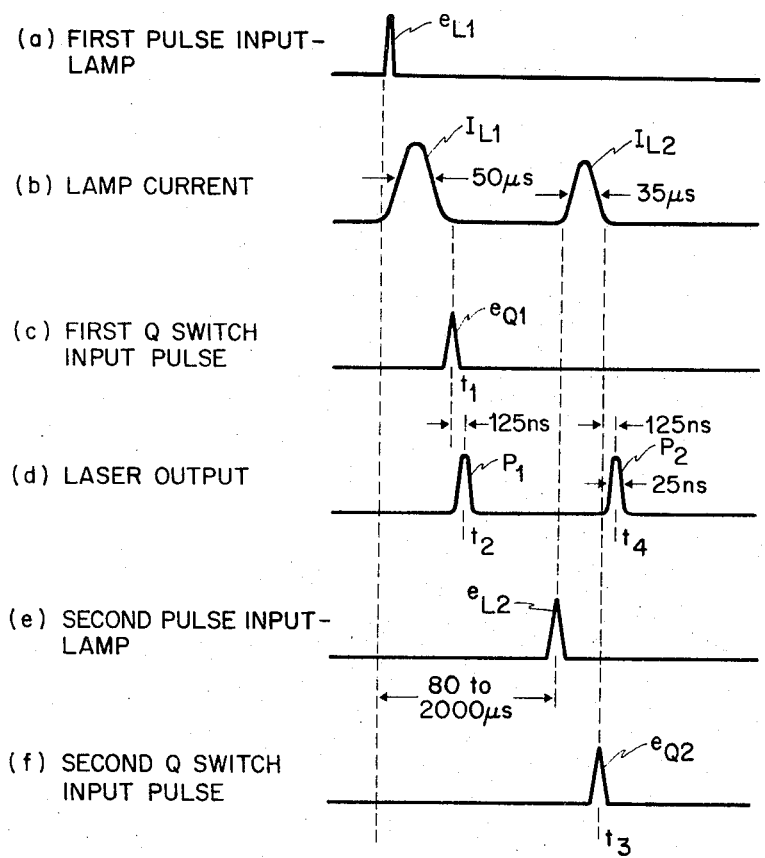
FIG. 3 is a waveform chart relating to the double Q-switched laser.

After the first laser pulse is emitted, the second flash lamp trigger pulse $e_{L2}$ shown in waveform (e) of FIG. 3, is applied to the gate electrode of the silicon controlled rectifier 52, causing the latter to conduct. The second trigger pulse $e_{L2}$ is applied before the flash lamp 42 deionizes to the extent that it would require another trigger pulse to the starting element 42, this time interval being about 2,000 microseconds or less. Upon discharge of the capacitor 56 through the rectifier 52 and primary winding of the transformer 58, the voltage induced in the secondary winding is impressed between the control grid and cathode of the gas switch tube 60, driving the grid positively and switching the tube 60 to the conducting state.

When the gas switch tube 60 conducts, it provides a conducting path for discharging the energy storage capacitor 68, which was blocked by the diode 64 from discharging into the discharged capacitor 48. The discharge current flows through the gas switch tube 60, choke 44, and flash lamp 12 and is blocked by diode 46 from discharging into capacitor 48. Still being ionized from the prior current pulse, the flash lamp 12 conducts the discharge current without requiring an additional trigger pulse on the starting electrode 42 and emits another burst of pumping radiation for the laser rod 10. The second flash lamp current pulse $I_{L2}$ is shown in waveform (b) of FIG. 3.

The interval between flash lamp trigger pulses $e_{L1}$ and $e_{L2}$ is purposely limited to be no greater, and preferably less, than the fluorescent life time of the laser rod. This is done to assure that when the second flash lamp pumping burst occurs, the laser rod is still in a populated condition resulting from the first flash lamp pumping burst. Being in a populated condition at the time of the second pumping burst, the laser rod does not require the same intensity of pumping energy than it did when it was in equilibrium and therefore the second capacitor 68 may have a lower capacitance value than the first capacitor 48. Furthermore, although the second flash lamp current pulse $I_{L2}$ is somewhat less intense than the first flash lamp current pulse $I_{L1}$ the second laser output pulse $P_2$ is about equal in intensity to the first laser output pulse $P_1$, as shown in waveform (d) of FIG. 3. The second laser pulse $P_2$ occurs shortly after application of a second Q-switch input pulse $e_{Q2}$, shown in waveform (f) of FIG. 3, at or near the termination of the second flash lamp current pulse $I_{L2}$, as will be more clearly evident from the following detailed description of the Q-switching circuit 28 of FIG. 1.

The Q-switching circuit about to be described is disclosed in copending application of William R. Hook and Ronald P. Hilberg, U.S. Pat. Ser. No. 264,153, filed June 19, 1972, entitled "Laser Q-Switching." Referring now to FIG. 4, which is a detailed schematic diagram of the Q-switch circuit 28, the first Q-switch input pulse $e_{Q1}$ is applied through a series resistor 70 to the gate electrode of a silicon controlled rectifier 72. The cathode of the rectifier 72 is grounded and the anode thereof is connected through a dropping resistor 74 to a positive dc voltage supply $V_{ct}$.

The anode of the rectifier 72 is connected through a capacitor 76 to one side of the primary winding of a pulse transformer 78. The other side of the primary winding and one side of the secondary winding are connected to a common ground.

The high voltage side of the secondary winding of the transformer 78 is connected through a blocking capacitor 80 to one electrode 26 of the electro-optic modulator 22, such as a Pockels cell, the other electrode 24 being grounded. The high voltage electrode 26 is also connected in series with a dropping resistor 82 to a high positive dc voltage $V_h$.

The second Q-switch input pulse $e_{Q2}$ is similarly applied through a series resistor 84 to the gate electrode of silicon controlled rectifier 86. The cathode of the rectifier 86 is grounded and the anode thereof is connected through a dropping resistor 88 to the positive dc voltage supply $V_{ct}$. The anode of the rectifier 86 is coupled through a blocking capacitor 90 to the high voltage side of the primary winding of the transformer 78.

The values given for the circuit components and voltages are exemplary for use with an Airtron one-fourth inch by 3 inch Nd:YAG laser rod and a 1 cm by 1 cm by 1 cm lithium niobate Pockels cell modulator in a cavity 18 inches long with a 40 percent output reflectivity.

The operation of the circuit of FIG. 4 will now be described with the aid of the graph of waveforms of FIG. 5, wherein waveform (a) is the Q-switch input pulse $e_{Q1}$ or $e_{Q2}$; waveform (b) is the transformer secondary voltage $V_p$; waveform (c) is the voltage $V_m$ across the electro-optic modulator; waveform (d) is the power loss ratio $P_2/P_1$ in the cavity; and waveform (e) is the laser output power $P_o$.

Prior to the application of the input pulse $e_{Q1}$, the silicon-controlled rectifier 72 is OFF, thereby blocking current flow therethrough in either direction. The capacitor 76 is charged to the potential of the voltage supply $V_{ct}$, or 185 volts. The voltage across the electro-optic modulator 22 is equal to the high positive dc voltage $V_h$ or 4.5 kilovolts.

At a time $t_1$ after pumping of the laser is initiated by the flow of the first flash lamp current pulse $I_{L1}$ shown in FIG. 3 and when the excited atoms in the laser rod have reached a state of high population inversion, the input pulse $e_{Q1}$ is applied to the gate electrode of the silicon controlled rectifier 72, whereby the latter is switched ON to provide a discharge path for the capacitor 76. When the capacitor 76 discharges through the primary winding of the transformer 78, the sudden change in current causes a transient oscillatory voltage pulse $V_p$ to appear in the secondary. The transformer secondary winding is phased such that the voltage pulse $V_p$ is a negative going pulse, and the turns ratio is such that the maximum amplitude of the voltage pulse $V_p$ is approximately twice the dc voltage $V_h$.

Figure 4:
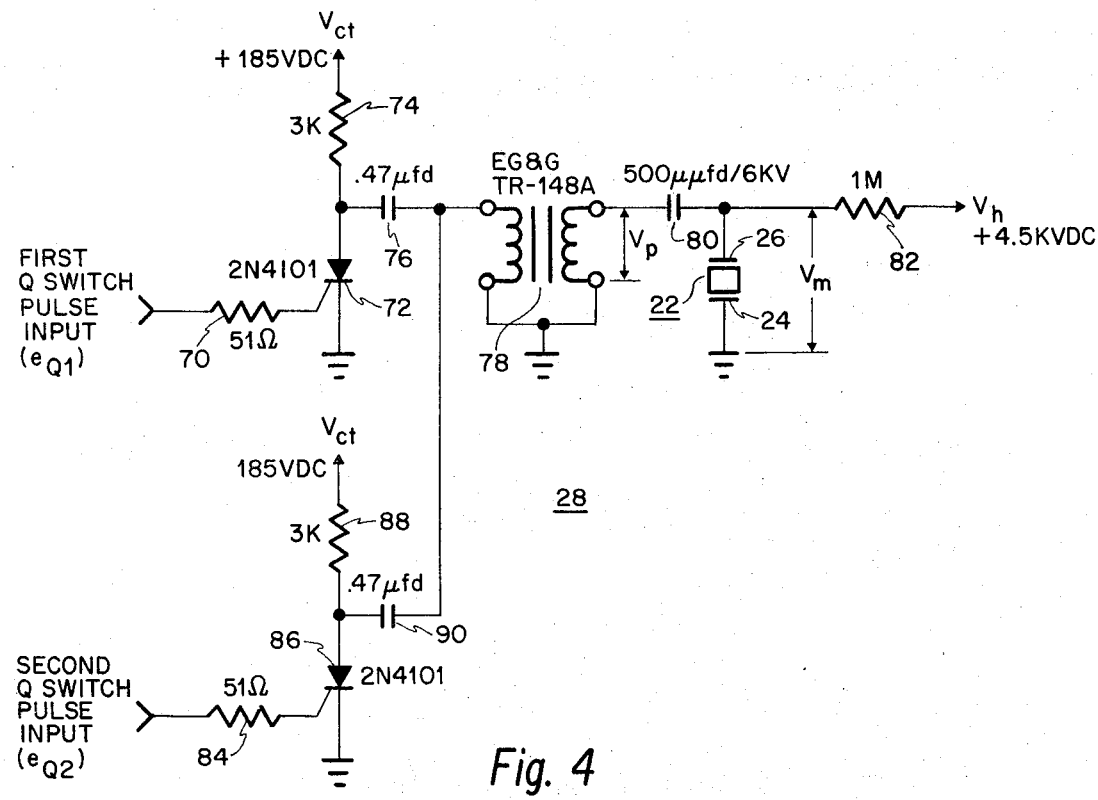
FIG. 4 is a circuit diagram of the Q-switch circuit portion of the double Q-switched laser.
Figure 5:
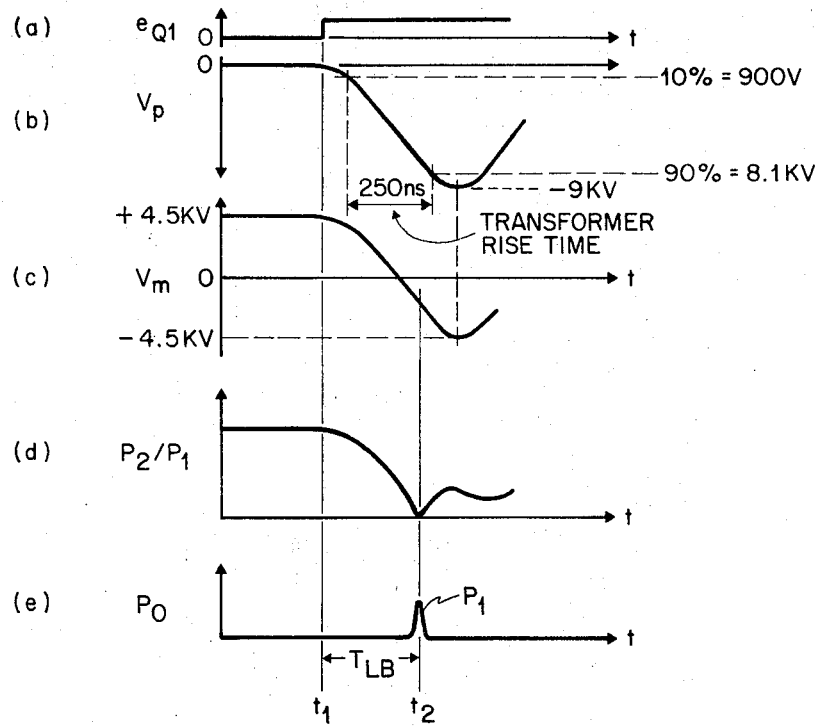
FIG. 5 is a graph of waveforms relating to the Q-switch circuit of FIG. 4.

The transformer secondary voltage pulse $V_p$ has a rise time of about 250 nanoseconds when a type TR148A transformer made by EG&G is used in the circuit of FIG. 4. As shown in waveform (b) of FIG. 5, the rise time is the time it takes the leading edge of the transformer secondary voltage pulse $V_p$ to rise from 10 percent of its peak value to 90 percent of its peak value.

The voltage $V_m$ across the electro-optic modulator 22 is shown in waveform (c) to fall from a value of 4.5 kilovolts through zero to a negative value of about 4.5 kilovolts in a little over 250 nanoseconds. The peak power output $P_o$ of the laser pulse is shown in waveform (e) as occurring at a time $t_2$ spaced from time $t_1$ by the laser build-up time $T_{LB}$. At time $t_2$, the voltage across the electro-optic modulator 22 is a negative value approximately midway between zero and its maximum negative value. Despite the fact that the electrooptic modulator 22 has a substantial voltage impressed on it when the output laser pulse appears, waveform (d) shows that the cavity power loss is at its mimimum or zero value at time $t_2$ when the output laser pulse reaches its maximum value. At this time the Q of the cavity is maximum.

Referring back to FIG. 3, $t_1$ is shown as the time near the termination of the first flash lamp current pulse $I_{L1}$ when the first Q-switch input pulse $e_{Q1}$ is applied and $t_2$ is the time the first laser pulse $P_1$ appears. At time $t_3$, the second Q-switch input pulse $e_{Q2}$ is applied to the second silicon controlled rectifier 86, and in the same manner previously described in connection with the first input pulse $e_{Q1}$ the voltage on the electro-optic modulator 22 is varied to produce the second laser output pulse $P_2$ at time $t_4$.

Still referring to FIG. 3, it is important to note that the interval between successive flash lamp trigger pulses $e_{L1}$ and $e_{L2}$ is substantially equal to the interval between Q-switch input pulses $e_{Q1}$ and $e_{Q2}$ and is no greater than the fluorescent life time of the laser. Consequently, the pumping energy for the second laser pulse need only be a fraction of that required for the first laser pulse because the laser is still populated when the second Q-switch actuation occurs. As a result, the overall efficiency of the laser is nearly equal to the efficiency of a single laser pulse having the same output energy as the total energy contained in laser pulses $P_1$ and $P_2$. Furthermore, the amplitude of the second laser pulse does not vary significantly over the above range of pulse intervals.

It is also emphasized that the interval between flash lamp trigger pulses $e_{L1}$ and $e_{L2}$ can be varied from about 80 microseconds to 2,000 microseconds, which is well within the deionization time of the flash lamp, before the latter requires another starting electrode pulse.

Additionally, the Q-switching circuit of FIG. 4 is particularly suited for the double pulse laser of this invention because it permits the electro-optic modulator to be switched twice in rapid succession, a feat that is difficult to accomplish with other circuits that use gas switch tubes that are limited in speed by their relatively slow recovery times.

A particular advantage of the present invention is that it allows the interval between two successive laser pulses in a train of such pulses to be varied either randomly or according to a predetermined pattern by using digital delay generating means to vary the time intervals between trigger pulses.

What is claimed is:

1. In a Q-switched laser apparatus provided with a solid laser medium and a Q-switch positioned adjacent to each other within a resonant cavity, and a flash lamp, provided with a starting electrode and a pair of main electrodes, positioned to irradiate said solid laser medium with pumping radiation, the improvement comprising:

a. means for energizing said flash lamp repetitively for supplying optical pumping energy to said solid laser medium in rapidly recurring bursts, said flash lamp energizing means including
 1. a first capacitor connected in a first discharge circuit through the main electrodes of said flash lamp,
 2. a second capacitor connected in a second discharge circuit through the main electrodes of said flash lamp,
 3. a common power supply for charging both said capacitors, and
 4. means for sequentially discharging said capacitors through said flash lamp to provide two closely time-spaced optical pumping bursts; and b. means for actuating said Q-switch at substantially the same rate that said flash lamp is energized but with a delay substantially equal to the duration of one of said optical pumping bursts;

c. the interval between successive optical pumping bursts being substantially equal to the interval between successive Q-switch actuations and no greater than the fluorescent life time of said solid laser medium, thereby to produce successive laser pulses spaced by intervals corresponding to the above-mentioned intervals.

2. The invention according to claim 1 and further including:

a first diode connected in said first discharge circuit in series between said first capacitor and said flash lamp;

a gas switch tube connected in said second discharge circuit in series between said second capacitor and said flash lamp; and a second diode connected between said second capacitor and said power supply.

3. The invention according to claim 2, and further including:

a first trigger circuit for applying a trigger pulse to the starting electrode of said flash lamp and thereby cause said first capacitor to discharge through said flash lamp; and a second trigger circuit for applying a trigger pulse to said gas switch tube and thereby cause said second capacitor to discharge through said gas switch tube and said flash lamp while said flash lamp is still ionized;

said diodes serving to block said second capacitor from discharging into said first capacitor.

4. The invention according to claim 3 and further including a choke in series with said flash lamp and in common with both said discharge circuits for limiting the discharge current through said flash lamp.

5. The invention according to claim 2 wherein said first capacitor has a greater capacitance than said second capacitor.

* * * * *